Figure 1:
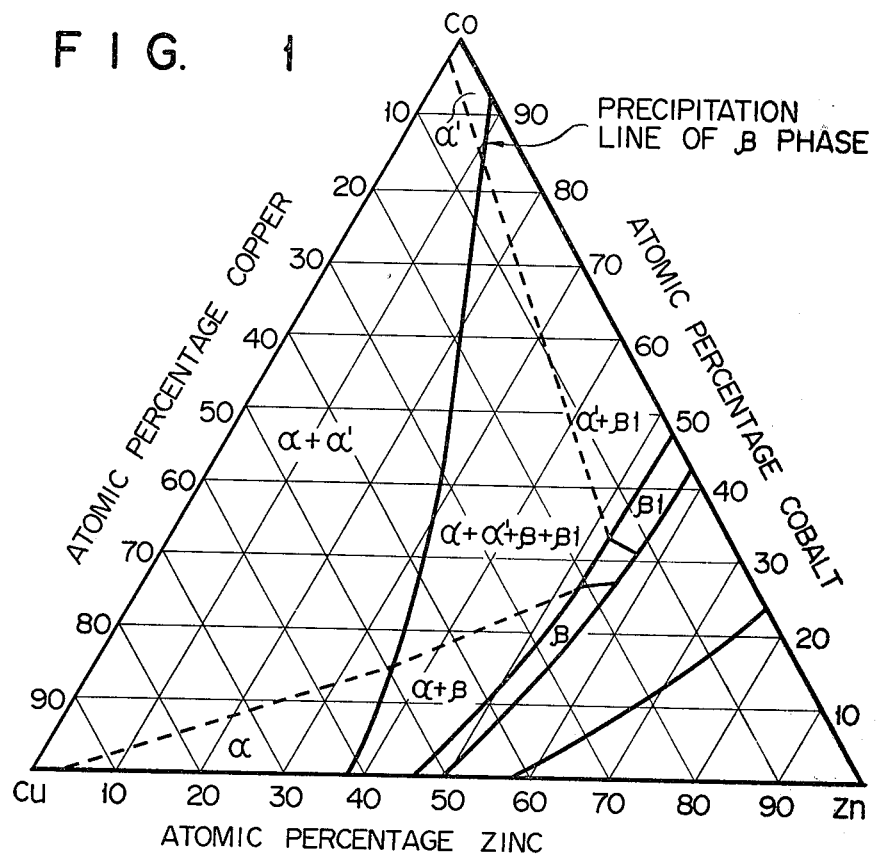

United States Patent [19]

Hachisuka et al.

[11] 4,265,678
[45] May 5, 1981

[54] METAL WIRE CORD

[75] Inventors: Shunji Hachisuka, Dejima; Shinji Kurashige, Kitakami; Yasuo Saahiro, Chiyoda, all of Japan

[73] Assignee: Tokyo Rope Mfg. Co., Ltd., Tokyo, Japan

[21] Appl. No.: 967,647

[22] Filed: Dec. 8, 1978

[30] Foreign Application Priority Data

Dec. 27, 1977 [JP] Japan .................................. 52-159908
Nov. 22, 1978 [JP] Japan .................................. 53-143282

[51] Int. Cl.³ .................................................. C21D 9/52
[52] U.S. Cl. ......................................... 148/12 B; 204/28
[58] Field of Search ..................... 72/47; 428/614, 673, 428/677; 75/157.5, 134 B, 134 C; 204/37 R, 27, 2.8; 148/11.5 Q, 12 B

[56] References Cited

U.S. PATENT DOCUMENTS

| | | | |
|---|---|---|---|
| 2,126,827 | 8/1938 | Smith | 75/157.5 |
| 2,563,113 | 8/1951 | Hindin et al. | 428/677 |
| 2,605,201 | 7/1952 | Howe | 428/677 |
| 2,746,135 | 5/1956 | Harris | 428/677 |
| 3,381,386 | 5/1968 | Winter | 428/614 |
| 3,698,880 | 10/1972 | Koons et al. | 204/37 R |
| 3,808,031 | 4/1974 | Brill-Edwards | 204/37 R |
| 3,857,681 | 12/1974 | Yates et al. | 204/37 R |
| 3,961,740 | 6/1976 | Nahamoto et al. | 428/677 |

FOREIGN PATENT DOCUMENTS 2455163  5/1975  Fed. Rep. of Germany .......... 75/157.5

Primary Examiner—M. J. Andrews
Attorney, Agent, or Firm—Frishauf, Holtz, Goodman & Woodward

[57] ABSTRACT

A metal wire cord which comprises a metal wire and a ternary alloy of Cu-Zn-Co coated on the surface of said metal wire. The wire cord has high drawability and such prominent adhesivity to rubber as is highly resistant to corrosion by saline water.

8 Claims, 2 Drawing Figures

THE PHASE DIAGRAM OF A TERNARY ALLOY OF Cu-Zn-Co

METAL WIRE CORD

This invention relates to a metal wire cord and more particularly to a metal wire cord having high drawability and high adhesion to rubber in saline water.

A tire cord hitherto used consists of a steel wire whose surface is plated with brass containing 63.5 to 72% by weight of copper. This type of wire is desired to be free from drawbacks such as breaking or the peeling of the plated layer during the drawing process. Particularly in recent years, a strong demand is made for the safety and waterproofness of a steel-reinforced tire. Importance is further attached not only to an original bonding force of steel cords to rubber but also to the bonding force of steel cords to rubber under heat and in water.

Generally, the adhesion of steel cords to rubber is improved by reducing the copper content of the brass which is plated on steel wires. However, a smaller copper content than 63% by weight gives rise to the drawback that the $\beta$ phase having a body centered cubic (b.c.c.) lattice structure precipitates in the $\alpha$ phase having a face centered cubic (f.c.c.) lattice structure in the brass. As a result, steel wire is often broken during the drawing process following the plating process, while the steel cords are manufactured. The drawing die has a shorter effective life, and noticeable irregularities appear on the surface of the plated layer.

It is accordingly the object of this invention to provide a metal wire which, during the drawing process, does not raise such problems as accompanied by the prior art method, but indicates high adhesion to rubber.

According to the invention, there is provided a metal wire cord comprising a metal wire, and a coating layer coated on the surface of said metal wire and formed of a ternary alloy of copper, zinc and cobalt containing 0.1 to 50% by weight of cobalt.

This invention will be more fully understood when taken in conjunction with the appended drawing, in which:

FIG. 1 shows the equilibrium phase diagram of a ternary alloy of Cu-Zn-Co; and

Figure 2:
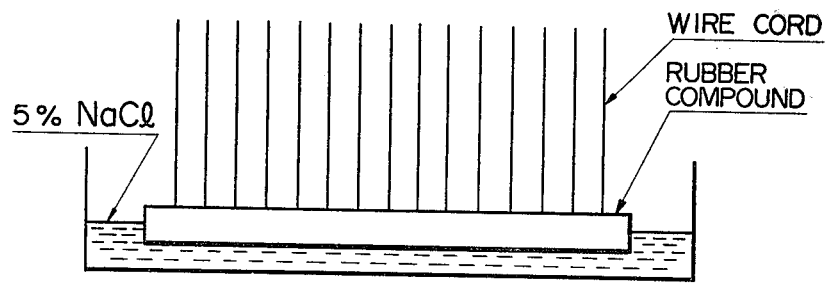

FIG. 2 schematically illustrates the process of testing the adhesion of a metal wire to rubber.

This invention is based on the discovery that addition of cobalt (Co) to brass as a third component elevates the drawability of said brass when plated on a steel wire without reducing the adhesion of said brass to rubber.

As seen from FIG. 1 showing the equilibrium phase diagram of a ternary alloy of Cu-Zn-Co, addition of Co to a binary alloy of Cu-Zn causes a line along which the $\beta$ phase precipitates to be shifted toward a region where the Cu/Zn ratio has a small value, thereby restricting the precipitation of the $\beta$ phase and elevating the drawability of said ternary alloy. A ternary alloy of Cu-Zn-Co has a higher adhesion to rubber than any composition of a binary alloy of Cu-Zn, even under a highly corrosive condition such as that in which saline water is present, and enables rubber compounds, which are to be bonded to said ternary alloy, to be selected over a broader range. This advantageous effect is believed to arise from the fact that a cobalt-containing metal sulfide formed in an interface between the ternary alloy of Cu-Zn-Co and adjacent vulcanized rubber remains appreciably stable physically as well as chemically. Further, the above-mentioned metal sulfide may contribute to the fact that the ternary alloy of Cu-Zn-Co has higher resistance to corrosion by saline water than that of the binary alloy of Cu-Zn.

Copper, zinc and cobalt constituting the ternary alloy used in this invention preferably have such proportions as substantially suppress the precipitation of the $\beta$ phase, in other words, allow for the presence of the $\alpha$ phase alone in view of the drawability of the metal wire.

The Zn content of the ternary alloy of the Cu-Zn-Co used in this invention generally falls within the range of 10% to 45% by weight, preferably 20% to 40% by weight. The Co content of said ternary alloy generally stands at 0.1% to 50% by weight, preferably 0.5% to 30% by weight, more preferably 1% to 20% by weight and most preferably 1% to 10% by weight. The balance is Cu.

The metal wire of this invention is manufactured by coating the above-mentioned ternary alloy of Cu-Zn-Co on, for example, a steel wire. Said coating may be carried out by chemical, electrical, or fusion plating. In addition to the direct plating of said ternary alloy, it is possible initially to plate the components separately one atop another and thereafter thermally diffuse the components uniformly throughout the whole mass, thereby providing a desired ternary alloy.

The convenient coating process is to plate on the steel wire Cu, Zn and Co in the order mentioned by an ordinary electrical plating method and diffuse the metals into each other under heat and time sufficient to provide the ternary alloy of Cu, Zn and Co. The diffusion may be conveniently carried out at 400° C. to 600° C. for 5 to 20 seconds.

The metal wire of this invention thus manufactured can be drawn by the ordinary wire-drawing machine to produce fine wires for reinforcement of rubber, for example, steel tire cords. The wire is generally drawn at such rate that the initial cross sectional area of a drawn wire reduces by 85 to 97%.

This invention will be more fully understood from the following examples. Throughout the examples, all percentages are by weight, unless otherwise expressly indicated.

EXAMPLE 1

The surface of a steel wire having a diameter of 1.24 mm was coated by electrical plating with Cu, Zn and Co separately in the order mentioned to produce a 3-ply plated layer. Thereafter, the components were thermally diffused uniformly throughout the plated mass at 550° C. for 5 to 30 seconds to provide ternary alloys of Cu-Zn-Co, 1µ thick, having the compositions of the samples Nos. 1 to 9 shown in Table 1 below.

TABLE 1

| | Composition and Drawability of Plated Alloy | | | | |
|---|---|---|---|---|---|
| No. | Cu (%) | Co (%) | Zn (%) | $(\alpha/(\alpha + \beta)) \times 100$ (%) | Drawability |
| 1 | 65.4 | 6.3 | 28.3 | 100 | Higher |
| 2 | 64.6 | 9.7 | 25.7 | 100 | Higher |
| 3 | 62.7 | 4.9 | 32.4 | 100 | Higher |
| 4 | 60.8 | 10.0 | 29.2 | 100 | Higher |
| 5 | 50.0 | 30.0 | 20.0 | 100 | High |
| 6 | 55.1 | 9.8 | 35.1 | 100 | Higher |
| 7 | 44.2 | 20.3 | 35.5 | 100 | High |
| 8 | 41.2 | 34.6 | 24.2 | 100 | High |
| 9 | 34.9 | 40.0 | 25.1 | 100 | High |
| Control 10 | 64.0 | — | 36.0 | 85* | Low |
| Control 11 | 60.8 | — | 39.2 | 70 | Low |

The plated steel wire was drawn 19 times on a continuous wet-type drawing machine, until the diameter was reduced to 0.25 mm. A commercially available alloy die was used. The rate of drawing was chosen to be 700 m/min at a point where the wire passed the final die.

During the drawing process, the drawability of the plated wire was determined from the frequency at which the plated wire was broken and a decline in the effective life of the drawing die, the results being set forth in Table 1 above. The frequency of breakage was determined from the number of times one ton of a plated steel wire was broken, before the diameter was reduced to 0.25 mm. The effective life of the drawing die was measured from the quantity of a plated steel wire which was drawn through the die. The term "higher" given under the item of drawability of Table 1 above denotes the case where the frequency of breakage was lower than 5 times/ton and more than 600 kg of a plate steel wire was drawn through the die. The term "high" represents the case where the frequency of breakage was 6 to 19 times/ton, and 100 to 600 kg of a plated steel wire was drawn through the die. The term "low" indicates the case where the frequency of breakage was more than 20 times/ton and less than 100 kg of a plated steel wire was drawn through the die. The rate of drawing and the life of a drawing die are generally largely affected by the type of die and the kind of a drawing lubricant. In this example, therefore, comparison was made between the drawabilities of the respective samples by applying the same type of a die, the same kind of a lubricant and the same type of a drawing machine.

Steel wires plated with the prior art binary alloy of Cu-Zn were tested as controls (samples Nos. 10 and 11 in Table 1). The drawability of these plated steel wires was determined in the same manner as described above, the results being also indicated in Table 1.

Sample No. 10 represents the plating of brass, in which a plurality of plating baths of the same cyanide type were used. It has been experimentally proved that even where plating is carried out quite uniformly, a lower Cu content in the plating bath than 63% results in the precipitation of the $\beta$ phase. Where any slight change occurred in the operating condition of the above-mentioned plural plating baths, then the $\beta$ phase sometimes precipitated in some of said baths whose Cu content was even slightly over 63%, thus giving rise to a plated structure in which the $\alpha$ and $\beta$ phase was co-present. It has been experienced that a plated layer having such structure falls in drawability. The above-mentioned sample No. 10 decreased in drawability to support this fact.

EXAMPLE 2

The surface of steel wires having diameters of 0.97 mm, 1.10 mm, 1.24 mm and 1.60 mm respectively were coated with Cu, Zn and Co separately in the order mentioned to provide a 3-ply plated layer. The three components were thermally diffused throughout the plated mass to form a ternary alloy of Cu-Zn-Co. The samples were drawn and twisted together to produce a steel cord plated with the ternary alloy of Cu-Zn-Co (hereinafter referred to as "a tire cord") having the structure and composition indicated in Table 2.

TABLE 2

Tire cords manufactured for trial by plating the surface with a ternary alloy of Cu—Zn—Co

| Structure | Diameter of a drawn wire (mm) | Original diameter of a wire before drawn (mm) | Cu (%) | Co (%) | Zn (%) |
|---|---|---|---|---|---|
| 2 + 7 (0.22)+1 | 0.22 | 1.10 | 59.5 | 3.4 | Remainder |
| 1 × 5 (0.25) | 0.25 | 1.24 | 63.3 | 4.4 | " |
| 3(0.20) + 6(0.35) | 0.20 | 0.97 | 64.3 | 1.2 | " |
|  | 0.35 | 1.60 |  |  |  |

To examine the adhesion to rubber of the tire cords thus prepared, the samples of tire cords were inserted, as illustrated in FIG. 2 showing a test apparatus, in various rubber compounds in a vertical direction to the extent of 12.7 mm length as measured from the lower end in conformity to the ASTM D2229. Thereafter, the rubber compounds were vulcanized. Each vulcanized rubber compound into which the samples of tire cords were vertically inserted was dipped in a 5% solution of sodium chloride at room temperature (18° to 25° C.) to the extent of about half the thickness of the rubber compound. After 4 or 5 days, the tire cord was pulled out at the rate of 100 m/min. Determination was made of the percentage adhesivity (0 to 100%) of rubber to the tire cord, the results being indicated in Table 3 below. The rubber compounds used consisted of commercially available tire rubber compounds A to G of different kinds shown in Table 3 below.

TABLE 3

Results of testing the resistance of tire cords to vulcanized rubber in saline water

| Steel Tire Cord | | Rubber Compound | | | | | | |
|---|---|---|---|---|---|---|---|---|
| | | A | B | C | D | E | F | G |
| | | Day | | | | | | |
| | | 5 | 5 | 4 | 4 | 4 | 4 | 4 |
| Control 1 × 5 (0.25) | A(66.7Cu—Zn) | 7% | 5% | 13% | 27% | 40% | 33% | 40% |
| " | B(66.3Cu—Zn) | 8 | 17 | 10 | — | 30 | 15 | — |
| " | C(67.4Cu—Zn) | 12 | 0 | 10 | 47 | 30 | 37 | 45 |
| " | D(68.2Cu—Zn) | 63 | 56 | 10 | 13 | 70 | 43 | 50 |
| " | E(63.7Cu—Zn) | 43 | 7 | 17 | 30 | 0 | 30 | 70 |
| " | F(67.1Cu—Zn) | 8 | 20 | 3 | 33 | 40 | 30 | 40 |
| " | G(70.5Cu—Zn) | 3 | 23 | 20 | 40 | 30 | 35 | 50 |
| Invention 1 × 5(0.25) | Cu—Zn—Co | 63 | 63 | 37 | 53 | 50 | 45 | 45 |
| Invention 2 + 7(0.22)+1 | " | 78 | 72 | 87 | 95 | 50 | 35 | 70 |
| Invention 3 + 6(0.35) | " | 63 | 65 | 63 | 85 | 50 | 63 | 80 |

Note: Numerals given in Table 3 above show the area of the surface of tire cords to which rubber adhered after the cords were dipped in saline water and thereafter pulled out.

Note: Numerals given in Table 3 above show the area of the surface of tire cords to which rubber adhered after the tire cords were dipped in saline water and thereafter pulled out.

Vulcanization was carried out at such temperature and pressure and for such length of time as are specifically defined for the rubber compounds used. As used herein, the term "vulcanization" is defined to mean the so-called original vulcanization.

Tire cords produced by plating steel wires with the prior art binary alloy of Cu-Zn (Controls A to G of Table 3 above) were tested for rubber adhesivity resistant to corrosion by saline water, the results being set forth in Table 3 above.

As apparent from Examples 1 and 2, a metal wire plated with a ternary alloy of Cu-Zn-Co embodying this invention has a higher drawability and rubber adhesivity resistant to corrosion by saline water than a metal wire plated with the prior art binary alloy of Cu-Zn.

EXAMPLE 3

According to the procedure of Example 2, tire cords of 1×5(0.25) were prepared from steal wires plated with Cu-Zn-Co alloys containing 62% of Cu, different amounts of Co indicated in Table 4 and the balance of Zn. The adhesivity of the tire cords to a rubber compound was tested as in Example 2. Results are shown in Table 4 below.

TABLE 4

| | | Adhesivity | | | | | |
|---|---|---|---|---|---|---|---|
| | | Initial* | | In saline water (after 3 days) | | In saline water (after 7 days) | |
| Sample | Co (%) | Pulling** strength (Kg) | Percentage adhesivity (%) | Pulling** strength (Kg) | Percentage adhesivity (%) | Pulling** strength (Kg) | Percentage adhesivity (%) |
| No. 12 | 0.1 | 40.8 | 90 | 36.2 | 84 | 30.8 | 63 |
| No. 13 | 1 | 43.2 | 95 | 39.6 | 87 | 35.7 | 77 |
| No. 14 | 3 | 44.0 | 93 | 40.0 | 90 | 34.2 | 71 |
| No. 15 | 5 | 44.2 | 95 | 41.2 | 91 | 38.3 | 80 |
| No. 16 | 10 | 41.3 | 95 | 40.0 | 83 | 37.0 | 75 |
| No. 17 | 20 | 40.0 | 88 | 36.2 | 75 | 35.0 | 69 |
| No. 18 | 25 | 35.0 | 80 | 34.0 | 69 | 28.3 | 43 |
| No. 19 | none | 41.5 | 90 | 29.0 | 53 | 15.0 | 10 |

Note:
*Adhesivity to vulcanized rubber compound after 1 day.
**Pulling strength (Kg/12.7 mm) at a pulling rate of 100 mm/min.

As apparent from Table 4, Cu-Zn-Co alloys containing 0.1 to 20% by weight of Co are particularly effective in improving the adhesivity of tire cords to rubber compound in saline water.

What we claim is:

1. A method of manufacturing a metal wire cord, which comprises the steps of:
   forming on the surface of a metal wire a coating layer formed of a ternary alloy of copper, zinc and between 0.1 and 50% by weight cobalt to produce a metal wire; and
   drawing said metal wire.

2. The method according to claim 1, wherein the metal wire is drawn, until the cross sectional area is reduced by 85% to 97%.

3. The method according to claim 1, wherein the process of forming the coating layer comprises plating copper, zinc and cobalt separately in the order mentioned on said surface in the form of a multiply layer, and heating said multiply layer to cause copper, zinc and cobalt to be uniformly diffused throughout said layer.

4. The method according to claim 1, wherein the ternary alloy contains copper, zinc and cobalt in a proportion such that the precipitation of the $\beta$ phase is suppressed.

5. The method according to claim 1, wherein the zinc content of the ternary alloy ranges between 10% by weight and 45% by weight.

6. The method according to claim 4, wherein the zinc content of the ternary alloy ranges between 20% by weight and 40% by weight.

7. The method according to claim 1 or claim 5 wherein the cobalt content of the ternary alloy ranges between 0.5% by weight and 30% by weight.

8. The method according to claim 1 or claim 6, wherein the cobalt content of the ternary alloy ranges between 1% by weight and 10% by weight.

* * * * *